UNITED STATES PATENT OFFICE 1,982,311

PRODUCTION OF VALUABLE COMPOUNDS OF THE ANTHRACENE SERIES

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application February 7, 1930, Serial No. 426,761. In Germany February 15, 1929

10 Claims. (Cl. 260—61)

The present invention relates to the production of valuable organic compounds of the anthracene series.

We have found that valuable compounds are obtained by treating with nitrating agents compounds of the anthracene series the carbon skeleton of which comprises two anthracene radicles coupled together in a mirror image arrangement by at least one condensed six membered ring, the 1- and 1'-positions of the said anthracene radicles being vicinal carbon atoms of the said six membered ring, the carbon skeleton of the said compounds being shown in the following formulæ:

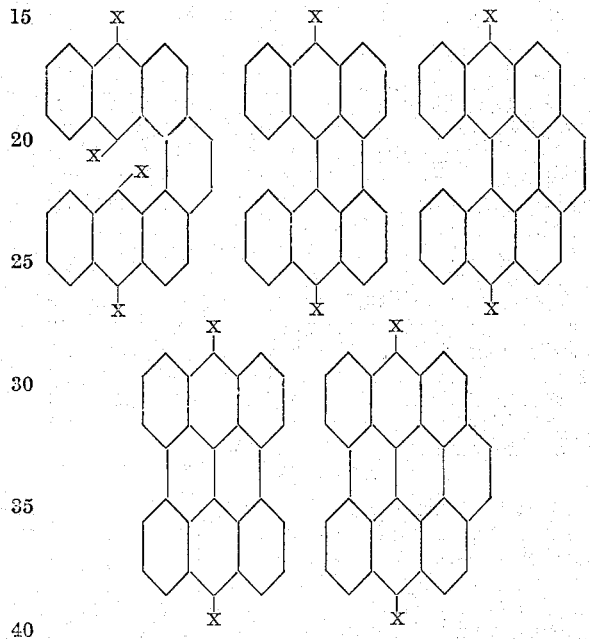

wherein X stands for hydrogen or oxygen, the nitro groups in the nitro compounds thus obtained being partially or wholly replaced by other radicles by known methods if desired. It is often preferable to carry out the nitration of these substances in the presence of solvents or diluents as for example in nitrobenzene, halogenbenzene such as chlorbenzene, dichlorbenzene, bromobenzene, trichlorbenzene, or quinoline or pyridine; concentrated nitric acid may be used alone, however, or in admixture with water, sulphuric acid, phosphoric acid, oleum or chlorosulphonic acid.

The nitro compounds are usually obtained in good yields and in a state of excellent purity. Mono-, di-, or polynitro compounds are formed according to the reaction conditions.

Thus, for example a uniform mono-nitro derivative is obtained in a quantitative yield by nitrating allo-ms-naphthodianthrone with the calculated amount of nitric acid in organic solvents, such as nitrobenzene; in an analogous manner with from 2 to 3 molecular proportions of nitric acid a dinitro derivative is obtained; when working, however, in the absence of solvents or diluents, trinitro or tetranitro derivatives are obtained. All the aforesaid products can also be obtained in inorganic solvents or diluents as for example sulphuric acid by the use of nitric acid or nitrates as nitrating agents; however, under these conditions oxidation of the initial materials may occur simultaneously, leading to the formation of hydroxy compounds or to dehydrogenation of the initial materials, resulting in the formation for example of nitro-ms-naphthodianthrone from ms-benzdianthrone or of nitro-ms-anthradianthrone from allo-ms-naphtho-dianthrone.

The nitro compounds obtained may, if desired, be purified or freed from isomeric compounds formed as by-products by the usual methods, for example by crystallization, or by way of their oxonium salts, or by extraction with organic solvents or with aqueous alkali solutions, or by treatment with oxidizing agents, or by sublimation.

The nitro groups in the new compounds may be replaced directly by halogen atoms. They may also often directly be replaced by sulphonic acid groups, for example by treatment with alkali metal bisulphites, or by hydroxyl groups. Thus, by treating with benzoyl chloride, the nitro compounds are directly converted into uniform chlorine derivatives; by treating the nitro compounds directly with halogens or agents splitting off halogens, the corresponding halogen derivatives are obtained directly. In the case of nitro compounds containing only a small number of nitro groups, the corresponding halogen derivatives obtained as intermediate products, are simultaneously further halogenated; for example when treating mono-nitro-allo-ms-naphtho-dianthrone with bromine in nitrobenzene, reaction products are obtained which contain two or more atoms of bromine in the molecule and are free from nitrogen.

By reducing the nitro compounds the corresponding amino compounds are obtained. The reduction of polynitro derivatives may be effected, if so desired, by stages. The amino compounds can be converted by treatment with acylating agents, for example with acids, acid halogenides or acid anhydrides, into the corresponding acyl amino derivatives among which those derived from polynuclear carboxylic acids which preferably should contain at least one ketone group, are particularly valuable. When treating the amino compounds with alkylating, arylating or similar agents, the amino groups are converted into alkylamino, arylamino or similar groups. A similar substitution takes place when treating the amino compounds with organic compounds containing one or more negative substituents, for example with negatively substituted compounds of the benzene, naphthalene, anthracene, benzanthrone, pyranthrone, dibenzanthrone, isodibenzanthrone, anthranthrone, acridone or pyrazolanthrone series, whereby reaction products of the type of imides or of the type of carbazols are obtained, which dye most different shades according to the nature of their constituents. When treating the amino compounds with aldehydes, azomethines are obtained. By treatment with benzotrichloride in the presence of sulphur, the amino compounds are converted into thiazol derivatives.

By diazotizing the amino compounds and further converting them by known methods, they can be converted with excellent yields into the corresponding halogen compounds (fluorine, chlorine, bromine and iodine derivatives) and also into cyanogen, thiocyanogen, hydroxyl and mercapto derivatives or their conversion products, such as carboxylic derivatives or disulphides; and the hydroxyl or mercapto derivatives may be etherified or acylated and the carboxylic derivatives esterified.

The derivatives of the ms-benzdianthrone or allo-ms-naphthodianthrone series, obtainable according to the present invention may be converted by known methods, in some cases simultaneously with the operation leading to their formation, into the corresponding ms-naphthodianthrone or ms-anthradianthrone derivatives respectively by dehydrogenation or oxidation.

The reaction products obtainable according to the present invention are valuable intermediate products for the manufacture of dyestuffs and those which are capable of being vatted, in particular the halogen derivatives, imides and alkoxy derivatives, are themselves dyestuffs having excellent properties.

Among the numerous new derivatives obtainable according to the present invention, those are particularly valuable which contain at least one nitro group, or hydroxyl group (whether free or etherified by hydrocarbon radicles).

The following examples will further illustrate the nature of this invention but the invention is not restricted to these examples. The parts are by weight.

*Example 1*

38 parts of ms-benzodianthrone are suspended in 140 parts of nitrobenzene and 12 parts of nitric acid of specific gravity 1.53 are gradually added, while stirring, at from 80° to 90° C. The whole is stirred for two hours at from 80° to 90° C., allowed to cool, filtered by suction, the residues treated with steam to drive off the nitrobenzene, and the reaction product dried. The mononitro-ms-benzodianthrone obtained, which crystallizes in beautiful brown red leaflets from trichlorobenzene, melts at about between 330° and 335° C., dissolves in concentrated sulphuric acid giving a blue red coloration and dyes cotton from a green vat violet shades not fast to chlorine. By passing chlorine at from 140° to 150° C. into a solution of the product obtained in trichlorobenzene the nitro group is replaced by chlorine.

In a similar manner the corresponding mononitro derivative may be obtained from 2,2'-dimethyl-ms-benzodianthrone.

*Example 2*

183 parts of allo-ms-naphthodianthrone suspended in 1000 parts of nitrobenzene are heated to from 85° to 95° C., and 54 parts of nitric acid of specific gravity 1.53 are gradually added. The whole is stirred for 2 hours, allowed to cool, filtered by suction, treated with steam in order to remove the nitrobenzene, and the reaction product is dried. The mononitro-allo-ms-naphthodianthrone obtained, which crystallizes from trichlorobenzene in lustrous brown red crystals, dissolves in concentrated sulphuric acid giving a green coloration and gives a blue vat with an alkaline hydrosulphite solution.

Monochlor-allo-ms-naphthodianthrone may be obtained from the before described mononitro compound by boiling with benzoyl chloride, and this gives orange red dyeings from a violet vat.

By oxidizing the nitro-allo-ms-naphthodianthrone, while dissolved in sulphuric acid, mononitro-ms-anthradianthrone is formed in a smooth reaction.

Under the same conditions dichlor-allo-ms-naphthodianthrone, obtainable according to the British Patent No. 303,184 yields mononitrodichlor-allo-ms-naphthodianthrone.

*Example 3*

9.5 parts of ms-naphthodianthrone are dissolved in 240 parts of sulphuric acid and a mixture of 4.5 parts of concentrated nitric acid and 18 parts of sulphuric acid is added at between 5° and 10° below zero centigrade. The temperature is allowed slowly to rise to room temperature during the course of 3 hours, and the whole is then poured on to ice, the reaction product filtered by suction, washed with water and dried. The product obtained, by analysis a mononitro-ms-naphthodianthrone, is a black green powder and is insoluble in organic solvents but dissolves in concentrated sulphuric acid giving a red coloration. It cannot be vatted but yields with an alkaline reducing agent the corresponding amino compound.

*Example 4*

6 parts of ms-anthradianthrone are suspended in 90 parts of nitrobenzene and 10 parts of a 96 per cent nitric acid are then slowly added at from 90° to 100° C. The whole is stirred for 3 hours at from 90° to 100° C., allowed to cool, filtered by suction, the filtration residue treated with steam for the purpose of removing the nitrobenzene and the reaction product dried. The nitro-ms-anthradianthrone obtained, which crystallizes from nitrobenzene in fine brown needles, dissolves in concentrated sulphuric acid giving a blue violet coloration and gives a blue vat.

*Example 5*

20 parts of 2,2'-dimethyl-ms-benzodianthrone are suspended in 120 parts of nitrobenzene. The whole is heated to from 85° to 95° C. and 19 parts of highly concentrated nitric acid are slowly introduced, while stirring. The whole is kept at this temperature for 2 hours and is then allowed to cool. In order to complete the crystallization from 40 to 60 parts of water may be stirred in. After several hours the whole is filtered by suction, the filtration residue being treated with steam and dried. The resulting dinitrodimethyl-ms-benzodianthrone may be obtained in lustrous orange coloured needles by crystallization from boiling trichlorobenzene, and these dissolve in concentrated sulphuric acid giving a violet red coloration and give a green vat.

Under similar conditions other dinitro derivatives may be obtained, as for example, dinitro-ms-benzodianthrone and dinitro-allo-ms-naphthodianthrone.

Example 6

36 parts of the mononitro-allo-ms-naphthodianthrone obtainable according to Example 2 are made into a paste with 300 parts of water and boiled for several hours with 100 parts of sodium sulphide. The reaction product is then filtered off by suction, washed and dried. The monoamino-allo-ms-naphthodianthrone thus obtained is a blue black powder and crystallizes from nitrobenzene in the form of fine black needles. The coloration of its sulphuric acid solution is green.

The nitro compounds specified in the other examples may be reduced to the corresponding amines in a similar manner. Other reducing agents as for example hydrazine hydrate or sodium hydrosulphite may be employed.

Example 7

10 parts of mono-amino-ms-benzodianthrone obtainable in the manner described in the foregoing example from the product described in Example 1 are heated to 100° C. in 120 parts of nitrobenzene. 5 parts of benzoyl chloride are added, the whole is heated to from 140° to 150° C., while stirring, and after half an hour is allowed to cool. After the addition of a little soda the nitrobenzene is distilled with steam. The monobenzoylamino-ms-benzodianthrone, which remains behind, crystallizes from trichlorbenzene in brown red crystals, which dissolve in concentrated sulphuric acid giving a blue coloration and dye cotton from a green vat very fast orange yellow shades.

The acyl derivatives of other mono-, di- and poly-amines obtainable by the method described in Example 6 may be obtained in a similar manner; the reaction, however, is not limited to the use of benzoyl chloride but other acid chlorides of higher molecular weight, for example those of the anthraquinone series, such as 1-aminoanthraquinone-2-carboxylic acid chloride may be employed. As representatives of this group of dyestuffs may be mentioned benzoylamino-ms-anthradianthrone and 1-aminoanthraquinone-2-carbonylamino-allo-ms-naphthodianthrone. The latter dyes cotton clear powerful blue red shades of very good fastness.

Example 8

12 parts of the monoamino-ms-benzodianthrone employed in the foregoing example, 7.4 parts dibromo-3,4,8,9-dibenzo-pyrene-5,10-quinone obtainable by bromination of 3,4,8,9-dibenzopyrene-5,10-quinone in chlorosulphonic acid in the presence of iodine, 5 parts of potassium carbonate and from 1.5 to 2 parts of copper oxide are heated in 200 parts of naphthalene, while stirring, at from 200° to 210° C. until the formation of dyestuff is completed. The whole is then filtered by suction while hot and the naphthalene is distilled off with steam. The black grey residue may be crystallized from trichlorobenzene. It dissolves in concentrated sulphuric acid giving a blue coloration and yields yellow brown dyeings on cotton from a dull red vat.

The other amines may be brought to reaction with mono-, or poly-halogen compounds in a similar manner.

Example 9

5 parts of monoamino-allo-ms-naphthodianthrone are dissolved in 100 parts of sulphuric acid and are diazotized with the calculated quantity of nitrous acid. The diazo compound formed is isolated by stirring the solution in ice and filtering off by suction and is converted into monoiodo-allo-ms-naphthodianthrone with potassium iodide, while stirring in aqueous solution. The product is a red substance, which crystallizes from trichlorobenzene in short lustrous prisms. It dissolves in concentrated sulphuric acid giving a green coloration and dyes the fibres rose coloured shades from a blue red vat.

The amino group may be replaced not only by halogen but also in the usual manner by other univalent radicles as for example hydroxy groups, mercapto groups, or by cyanogen or thiocyanogen radicles, and the products obtained may in some cases be etherified or saponified and esterified.

Example 10

21 parts of the monoamino-allo-ms-naphthodianthrone described in Example 6 are heated to boiling with 7 parts of o-chlorobenzaldehyde in 100 parts of nitrobenzene for a short time. The whole is then allowed to cool and the reaction product is filtered off by suction. The azomethine obtained forms brown red crystals, which dye cotton blue red shades from a blue red vat.

Analogous reaction products are obtained from amino-ms-benzo-, amino-ms-naphtho- and amino-ms-anthra-dianthrones.

Other aldehydes as for example 1-aminoanthraquinone-2-aldehyde may be employed instead of o-chlorobenzaldehyde.

Example 11

81 parts of allo-ms-naphthodianthrone are introduced, while strongly cooling by means of a mixture of ice and common salt and stirring, into 810 parts of 96 per cent nitric acid, and the whole is stirred for a short time; first of all solution takes place and then the separation of part of the reaction product, which is filtered off by suction. The major portion of the reaction product, which according to analysis is a tetranitro-allo-ms-naphthodianthrone, is thus obtained in the form of orange red crystals and the remainder may be recovered by precipitation with water and filtration by suction. The tetranitro-allo-ms-naphthodianthrone dissolves in concentrated sulphuric acid giving a red coloration and dyes cotton from a violet blue vat grey shades, which are not fast to chlorine.

In a similar manner a tetranitro derivative is obtained from ms-benzodianthrone, which is an orange coloured powder and dissolves in concentrated sulphuric acid giving a rose red coloration.

Example 12

2 parts of allo-ms-naphthodianthrene (obtainable by heating allo-ms-naphthodianthrone with hydriodic acid and phosphorus to between 140° and 150° C., crystallizing from pyridine in the form of rhombic tablets) are introduced at 10° below zero C. into 20 parts of concentrated nitric acid. The temperature is allowed to rise gradually to room temperature, while stirring, whereupon the mass is poured onto ice, filtered by suction and dried. A tetranitro derivative is obtained, which is a brown powder and which dissolves in concentrated sulphuric acid giving a brown red solution.

*Example 13*

25 parts of mono-amino-allo-ms-naphthodianthrone (obtainable by reducing mono-nitro-allo-ms-naphthodianthrone, prepared as hereinbefore described) are heated, while stirring, to 110° C. in 280 parts of nitrobenzene with 3.8 parts of 1,3,5-trichlortriazine (cyanuric chloride), 2 parts of sodium acetate and 0.5 part of copper sulphate. The said temperature is maintained for several hours, the mass is then boiled for a short time, allowed to cool and worked up in the usual manner. The resulting dyestuff is a bluish-red powder, dissolving in concentrated sulphuric acid giving a green solution, and dyes the vegetable fibre from a violet vat clear reddish-violet shades of excellent fastness, in particular very good fastness to washing and boiling with alkalies.

If desired, the crude dyestuff may be purified by recrystallization or by treating it, while in the form of a paste, with hypochlorite.

By treating the solution of the dyestuff in concentrated sulphuric acid with manganese dioxide at about 10° C. the corresponding ms-anthradianthrone derivative is obtained, which dissolves in concentrated sulphuric acid giving a violet solution.

The condensation may be carried out, instead of with 1,3,5-trichlortriazine, also with substituted halogen triazines or with quinazolines or other substances reacting in a similar way. It is also possible by suitably selecting the reaction conditions to replace only part of the halogen in the halogen triazine; if desired, the remainder of the halogen may be replaced simultaneously or afterwards by other suitable substituents.

The other amino compounds, obtainable by reducing the nitro compounds described in the foregoing, and also their derivatives as for example the alkyl-amino, aryl-amino or aralkyl-amino compounds react similarly to the amino-allo-ms-naphthodianthrone. The alkylation of the imino groups present in the reaction products may also be effected after the condensation.

*Example 14*

84 parts of mono-amino-allo-ms-naphthodianthrone, obtainable by reducing mono-nitro-allo-ms-naphthodianthrone, are heated for several hours to 100° C. in 1000 parts of benzo-trichloride with 200 parts of sulphur, while stirring, until the reaction is complete. The mass is allowed to cool, diluted with a little alcohol, and the separated reaction product is filtered off by suction. It is a bluish-red crystalline powder, dissolving in concentrated sulphuric acid to give a green solution, and dyes cotton from a violet vat very fast bluish-red shades. By treating it with oxidizing agents the corresponding ms-anthradianthrone derivative is obtained. The other mono- and polyamino compounds, obtainable according to the present invention, react in a similar manner.

What we claim is:

1. Naphthodianthrenes containing at least one nitro group.

2. Compounds of the anthracene series the carbon skeleton of which comprises two anthracene radicles coupled together in a mirror image arrangement by at least one condensed six membered ring, the 1- and 1'-positions of the said anthracene radicles being vicinal carbon atoms of the said six membered ring, containing at last two keto groups and at least one nitro group.

3. Compounds of the anthracene series the carbon skeleton of which comprises two anthracene radicles coupled together in a mirror image arrangement by at least one condensed six membered ring, arranged between the 1- and 9-positions of the anthracene radicles, the 1- and 1'-positions of the said anthracene radicles being vicinal carbon atoms of the said six membered ring, containing at least two keto and at least one nitro group.

4. Compounds of the anthracene series the carbon skeleton of which comprises two anthracene radicles coupled together in a mirror image arrangement by at least two condensed six membered rings one of which is arranged between the 1- and 9-positions of the anthracene radicles, the 1- and 1'-positions of the said anthracene radicles being vicinal carbon atoms of the said six membered ring, containing at least two keto groups and at least one nitro group.

5. Compounds of the anthracene series the carbon skeleton of which comprises two anthracene radicles coupled together in a mirror image arrangement by three condensed six membered rings one of which is arranged between the 1- and 9-positions of the anthracene radicles, the 1- and 1'-positions of the said anthracene radicles being vicinal carbon atoms of the said six membered ring, containing at least two keto groups and at least one nitro group.

6. Meso-anthradianthrones containing at least one nitro group.

7. Compounds of the anthracene series the carbon skeleton of which comprises two anthracene radicles coupled together in a mirror image arrangement by at least one condensed six membered ring, arranged between the 1- and 9-positions of the anthracene radicles, the 1- and 1'-positions of the said anthracene radicles being vicinal carbon atoms of the said six membered ring, containing two keto and one nitro group.

8. Compounds of the anthracene series the carbon skeleton of which comprises two anthracene radicles coupled together in a mirror image arrangement by at least two condensed six membered rings one of which is arranged between the 1- and 9-positions of the anthracene radicles, the 1- and 1'-positions of the said anthracene radicles being vicinal carbon atoms of the said six membered ring, containing two keto and one nitro group.

9. Compounds of the anthracene series the carbon skeleton of which comprises two anthracene radicles coupled together in a mirror image arrangement by three condensed six membered rings one of which is arranged between the 1- and 9-positions of the anthracene radicles, the 1- and 1'-positions of the said anthracene radicles being vicinal carbon atoms of the said six membered ring, containing two keto groups and one nitro group.

10. Mono-nitro-ms-anthradianthrones.

MAX ALBERT KUNZ.
KARL KOEBERLE.
GERD KOCHENDOERFER.